United States Patent [19]
Banach et al.

[11] Patent Number: 6,043,335
[45] Date of Patent: Mar. 28, 2000

[54] PHOSPHATE-CONTAINING CATALYST COMPOSITION FOR THE PREPARATION OF POLYESTERS, AND RELATED PROCESSES

[75] Inventors: Timothy Edward Banach, Scotia, N.Y.; Maurizio Fiorini, Bologna, Italy; Bimal Ramesh Patel, Evansville, Ind.; Francesco Pilati, Bologna, Italy; Corrado Berti, Lugi, Italy; Elisabetta Marianucci, Bologna, Italy; Massimo Messori, Bologna, Italy; Martino Colonna, Bologna, Italy; Maurizio Toselli, Bologna, Italy

[73] Assignee: General Electric Company, Schenectady, N.Y.

[21] Appl. No.: 09/411,275

[22] Filed: Oct. 4, 1999

[51] Int. Cl.$^7$ ............................. C08G 63/78; B01J 31/00; C08K 3/02

[52] U.S. Cl. ...................... 528/279; 528/280; 528/286; 528/302; 528/308; 528/308.6; 524/706; 524/783; 524/785; 502/102; 502/150; 502/159; 502/349; 502/350

[58] Field of Search .................................... 528/279, 280, 528/286, 302, 308.6, 308; 524/706, 783, 785; 502/102, 150, 159, 349, 350

[56] References Cited

U.S. PATENT DOCUMENTS

| 5,616,681 | 4/1997 | Itoh et al. | 528/279 |
| 5,902,873 | 5/1999 | Banach et al. | 528/279 |

*Primary Examiner*—Samuel A. Acquah
*Attorney, Agent, or Firm*—Noreen C. Johnson; Douglas E. Stoner

[57] ABSTRACT

Polyesters are prepared by the reaction of a dicarboxylic acid, preferably an aromatic acid such as terephthalic acid, or an ester or ester-forming derivative thereof with a dihydroxy compound such as 1,4-butanediol in the presence of a catalyst composition comprising the combination of a titanium-based compound such as tetra-n-butyl titanate, a zirconium-based compound such as zirconium tetrakis(2,4-pentanedionate) and a phosphate-forming compound such as sodium dihydrogen phosphate. This catalyst composition affords polyesters having relatively low melt viscosities in short reaction times and does not produce an excessive level of undesirable reaction by-products.

20 Claims, No Drawings

PHOSPHATE-CONTAINING CATALYST COMPOSITION FOR THE PREPARATION OF POLYESTERS, AND RELATED PROCESSES

BACKGROUND OF THE INVENTION

This invention relates generally to polymer technology. More particularly, it relates to catalysts for preparing thermoplastic polyesters.

Thermoplastic polyesters are very important polymer materials, produced commercially in large quantities. Linear thermoplastic polyesters such as poly(1,4-butylene terephthalate) (PBT) and poly(ethylene terephthalate) (PET) are used in a variety of forms. For example, they may be used in the form of synthetic fibers, which exhibit good resistance to most mineral acids and exhibit excellent resistance to cleaning solvents and surfactants. Thermoplastic polyesters are also used to a great extent as molding materials. Such materials are often highly crystalline, and are characterized by many desirable properties, such as hardness, strength, toughness, good chemical resistance, and low moisture absorption.

On a commercial scale, thermoplastic polyesters are usually produced in a two-stage polymerization process. The first stage is often referred to as "pre-condensation" or "ester interchange". It involves oligomer formation by ester interchange of dimethyl terephthalate (DMT) with a dihydroxy compound, such as a glycol. Alternatively, the first stage can involve esterification of an aromatic acid such as terephthalic acid with a dihydroxy compound.

The second stage is often referred to as "polycondensation". In this stage, the oligomer formed in the first stage is polymerized at elevated temperatures, as excess glycol is removed. The overall reaction can be carried out as a batch process, but is typically a continuous operation, using two or more reactors.

Titanium-based compounds such as tetra-n-butyl titanate or tetraisopropyl titanate are often used to catalyze the reactions described above. As described in U.S. Pat. No. 5,519,108, for example, PBT can be prepared by the reaction of DMT with 1,4-butanediol at about 220–260° C., using the titanium catalyst to initiate and accelerate the ester interchange reaction.

The presence of an effective catalyst is critical to the manufacturing process, especially in large scale operations where high yields and rapid processing times are required for economic production. The organotitanate compounds are effective to some degree in the production of polyesters like PBT. However, the rate of transesterification in the presence of such catalysts is relatively slow. Thus, long residence times are sometimes required to produce high molecular weight resins on an industrial scale. Furthermore, high reaction temperatures may be required, thereby producing undesirable carboxylic acid end groups on the polymer product being formed. The presence of these types of end groups wastes the diol component, e.g., the butanediol, via conversion to unrecoverable side products such as tetrahydrofuran (THF).

The ultimate effects of using a relatively slow catalyst in polyester production are lower reactor capacity, lower productivity, and higher production costs. Thus, any improvement in the catalyst should result in higher reactivity which will, in turn, eliminate or minimize the undesirable effects described above.

Another disadvantage frequently encountered in polyester synthesis is very high melt viscosity in the product. In order to be processable, it is advantageous for the polyester to have as low a melt viscosity as possible. Prior art catalysts, however, frequently afford a product having a melt viscosity which is inconveniently high, detracting from processability.

Alternative catalyst systems for the production of polyesters like PBT have been described in the prior art. For example, U.S. Pat. No. 5,519,108 describes the use of a titanium compound as a primary catalyst, along with a cocatalyst system which includes a combination of at least one compound based on Zn, Co, Mn, Mg, Ca or Pb, with various phosphite- or phosphate-based compounds. Another example is provided in Ignatov et al, *J. AppL Poly. Sci.*, 58, 771–777 (1995), which describes the use of various lanthanide catalysts in the production of PET. The use of a catalyst system including titanium or zirconium in combination with a rare earth element or hafnium, said system optionally also containing a phosphate-forming compound, is described in copending, commonly owned application Ser. No. 08/953,455.

There continues, however, to be a need for new catalysts or catalyst systems for preparing thermoplastic polyesters like PET and PBT. The new catalysts should be free from expensive elements such as rare earths or hafnium and should provide high reactivity during preparation of the polymer products. Use of such catalysts should afford polyesters in reaction times shorter than, or at least not substantially longer than, known catalysts and should not produce an excessive level of undesirable reaction by-products. The new catalysts should also be relatively economical to use. Finally, polyester products formed by polymerization processes employing the new catalysts should have relatively low melt viscosities, and otherwise substantially the same property profiles as products based on the use of conventional catalysts.

SUMMARY OF THE INVENTION

The invention in one of its aspects is a catalyst composition suitable for use in the preparation of a polyester or copolyester, comprising the combination of a titanium-based compound, a zirconium-based compound and a phosphate-forming compound, and any reaction products thereof.

Another aspect is a method for preparing a polyester, based, for example, on the two-stage process of ester interchange and polycondensation. The method is carried out in the presence of the above-described catalyst composition.

DETAILED DESCRIPTION PREFERRED EMBODIMENTS

It has not been determined, and is irrelevant for the purposes of this invention, whether the catalyst components do or do not undergo interreaction. Thus, the invention includes the combinations described herein as well as any reaction products thereof.

Two of the components of the catalyst composition of this invention are a titanium-based compound and a zirconium-based compound. Many suitable compounds of each type are known in the art.

Suitable titanium-based compounds, principally containing tetravalent titanium, include those of the formulas $Ti(OR)_4$ and $MgTi(OR)_6$, where R is an alkyl radical. Examples of tetravalent titanium-based compounds are tetraethyl titanate, tetra-n-propyl titanate, tetraisopropyl titanate, tetra-n-butyl titanate, tetra-(2-ethylhexyl) titasnate, titanium diisopropoxide bis(2,4-pentanedionate), titanium oxid e 2,4-pentanedionate and water-stable titanium compounds, e.g., those which include alcohol-type residues, like titanium (triethanolaminato)isopropoxide. In preferred embodiments, the titanium compound is of the Ti(OR)$_4$ type, e.g., tetra-n-butyl titanate.

Suitable zirconium-based compounds, also principally containing tetravalent zirconium, include those having the formula Zr(OR)$_4$, where R is as defined above. Examples of tetravalent zirconium-based compounds are zirconium acetate, zirconium tetrakis(2,4-pentanedionate), tetra-n-butyl zirconate, tetra-t-butyl zirconate, tetraethyl zirconate, zirconium isopropoxide isopropanol complex, tetra-n-propyl zirconate and zirconium tetrakis(trifluoro-2,4-pentanedionate).

Many of the titanium and zirconium compounds useful in the present invention are available commercially and/or can be readily synthesized by those of ordinary skill in the area of chemical synthesis. As an example, many details regarding relevant titanium compounds are provided in Kirk & Othmer, *Encyclopedia of Chemical Technology*, 3rd Edition, Vol. 23, (1983), 131–244, and the *Aldrich Catalogue-Handbook of Fine Chemicals*, 1996–1997. Many of the compounds are supplied in the form of solutions.

The catalyst composition of the invention further comprises a phosphate-forming compound, i.e., any compound which chemically or physically converts (e.g., via oxidation) to a phosphate-containing molecule during any stage of the polyester formation process. Exemplary classes of such compounds include alkali metal phosphates, alkali metal phosphites, alkali metal hypophosphites, and alkali metal polyphosphates. Some of these compounds are described in the previously mentioned U.S. Pat. No. 5,519,108.

Specific examples include sodium dihydrogen phosphate, trisodium phosphate, disodium hydrogen phosphate, disodium hydrogen phosphite, and sodium dihydrogen phosphite. The alkali metal hypophosphite can be a hypophosphite salt containing any number of alkali metal ions. The alkali metal polyphosphate can be a polyphosphate salt containing one, two, three, four or five alkali metal ions. Moreover, other alkali metals (e.g., potassium or lithium) can be used in place of sodium in many of these compounds. In some preferred embodiments, sodium dihydrogen phosphate, often in the form of the monohydrate, is the preferred phosphate-forming compound.

It is contemplated that the catalyst compositions of the present invention will be free from such previously disclosed materials as compounds of Zn, Co, Mn, Mg, Ca, Pb, lanthanides and hafnium. The presence of such compounds is not deemed necessary when the combination of titanium, zirconium and phosphate is employed.

The ratio of zirconium to titanium compound in the catalyst compositions of the invention is subject to wide variation and will depend on a variety of factors, such as the chemical activity of the particular catalyst, the particular monomers being used, the reaction profile employed (e.g., number of reactors, temperature regime, pressure conditions, residence time) and, in some instances, the specific improvement desired: e.g., short polymerization time, low product melt viscosity, etc. In general, the molar ratio of zirconium to titanium will be in the range of about 1–5:1, preferably about 2–4:1. Phosphate-based compound is most often present in a molar ratio of phosphate to titanium in the range of about 1–25:1, preferably about 10–25:1.

The catalyst constituents can be premixed in solution or can be added, separately or in various combinations, to the reaction system. Some discussion regarding the addition of the catalyst composition during formation of the polyester can be found below.

A wide variety of thermoplastic polyesters may be prepared with the catalyst compositions of the invention. As used herein, the term "polyesters" is meant to include both homopolymers and copolymers, as well as polymer mixtures which comprise at least about 50% by weight polyester. Most of the polyesters which are useful in this invention are based on the reaction of dihydroxy compounds with dicarboxylic acids or their esters or ester-forming derivatives. Information regarding polyesters and their preparation can be found in many references, such as Saunders, *Organic Polymer Chemistry* (1973: Chapman & Hall Ltd); Kirk & Othmer, *Encyclopedia of Chemical Technology*, 3rd Edition, Vol.18; and the following U.S. patents:

| | |
|---|---|
| 2,465,319 | 4,369,280 |
| 3,047,539 | 4,485,212 |
| 4,211,689 | 4,732,921 |
| 4,257,937 | 5,496,887 |
| 4,280,949 | 5,519,108. |
| 4,292,233 | |

While many of the polyesters of interest are linear, branched polyesters may also be prepared.

The dihydroxy compounds may be aliphatic, aromatic or alicyclic diols. Examples are ethylene glycol (ethanediol), 1,3-propanediol, 1,4-butanediol, cyclohexanediols such as 1,4-cyclohexanedimethanol, hydroquinone, resorcinol, bisphenol A, and "dimer diols" (e.g., 2,2,4,4-tetramethyl-1,3-cyclobutanediol). Mixtures of diols may also be used. These diols may contain up to about 10 mole percent (based on total diol) of additional diols such as alkyl-substituted diols (e.g., neopentyl glycols, alkylpropanediols, alkylpentanediols, alkylhexanediols).

The dicarboxylic acids may be aliphatic or aromatic, or may be based on mixtures of aliphatic and aromatic compounds. Examples are isophthalic acid, terephthalic acid, any of the above-mentioned acids, naphthalenedicarboxylic acids, alkyl-substituted derivatives thereof, and aliphatic dicarboxylic acids such as succinic acid, adipic acid, sebacic acid, azelaic acid, and decanedioic acid. Examples of esters which may be used in the preparation of the polymer are the alkyl-based esters, such as DMT, which are generally preferred, and analogous aromatic esters derived from, for example, phenols. As in the case of the diols, more than one dicarboxylic acid (or ester or ester-forming derivative) may be used in the polymerization reaction.

In some preferred embodiments, the polyester or copolyester is a poly(alkylene terephthalate), such as poly(1,4-butylene terephthalate), poly(ethylene terephthalate), copolymers of poly(1,4-butylene terephthalate) and copolymers of poly(ethylene terephthalate). These types of materials, many of which are crystalline, are described in the references set forth above. They often have a molecular weight sufficient to provide an intrinsic viscosity in the range of about 0.4–1.25 dl/g, measured as described hereinafter.

The poly(1,4-butylene terephthalate) polymers and copolymers are often preferred for certain embodiments, e.g., when the materials are to be used with reinforcing agents or when low temperature processing (e.g., molding) of the materials is to be undertaken.

Various techniques are available for preparing polyesters. As mentioned above, commercial materials are often produced in a two-stage polymerization process: ester interchange and polycondensation. Although polyester materials can be produced by a batch process, they are more often made by a continuous process, using a series of reactors, e.g., 2–6 reactors, followed by at least one finishing reactor. Often, the series reactors are of the CSTR (continuous stirred tank reactor) type, as described, for example, in Kirk & Othmer, *Encyclopedia of Chemical Technology*, 3rd Edition, Vol. 19 (1982). The level of agitation, e.g. stirring, in each reactor may vary considerably.

The reactors can operate under a sequential regime of increasing temperature and decreasing pressure. Typically, reaction temperatures will range from about 160–260° C., and more often about 185–245° C. The pressure in each reactor will usually be in the range of about 10–1200 mbar. Molar proportions of dihydroxy compound to dicarboxylic acid or ester thereof are usually in the range of about 1.1–1.8:1.

Usually, the ester interchange reaction will be carried out in the first reactor, or in the first 2–3 reactors. These initial oligomeric stages remove about 80–99% of the volatile by-products, of which methanol and 1,4-butanediol are the principal constituents. Sometimes the distinction between the ester interchange stage and the polycondensation stage is not entirely clear. However, for the purpose of this discussion the ester interchange stage is said to be substantially complete when at least about 99% of the theoretical amount of methanol has been taken out of the re action system.

The level of catalyst used will depend on many factors, such as the identity of the individual catalyst components, the monomers being employed and the type of reactors being used. This level is often expressed in terms of millimoles of catalytic metal, i.e., titanium and zirconium, per kilogram or mole of polyester ultimately formed, for convenience in view of the fact that pronounced changes in volume frequently occur during polymerization and crystallization. As used herein, the term "mole of polyester" is based on the number of structural units in the polyester. Thus, the number of moles of polyester is essentially the same as the number of moles of dicarboxylic acid or ester employed as a reactant in the synthesis of the polyester.

In general, the catalyst composition will be present at a level in the range of about 0.5–5.0 mmol, preferably about 1.0–2.0 mmol, of total titanium and zirconium compounds per mmol of dicarboxylic acid, ester or ester-forming derivative. Those skilled in industrial chemistry and chemical engineering will be able to determine without undue effort the appropriate catalyst level for a given situation, based on the teachings herein.

As mentioned above, the catalyst composition of the present invention can be added to the reaction system at various stages. In some preferred embodiments, all of the catalyst composition is added during the ester interchange stage, and more preferably at the beginning of this stage. Addition of the catalyst composition at this early point can help to prevent decomposition of the molten polymer being formed.

Those skilled in chemical engineering understand that a wide variety of reactor configurations and designs may be employed, and selection of a particular system depends on many factors, such as the specific types of reactants and catalysts employed, the volume of product being prepared, energy requirements, environmental parameters, the desired molecular weight of the polyester product and its viscosity. On an industrial scale, the continuous reaction process usually concludes with the use of one or more finishing reactors. They are often plug flow reactors, which are particularly useful for treating high viscosity melt materials. Other details of product recovery, isolation, and compounding are generally well known in the art.

The invention is illustrated by the following examples in which the following abbreviations are used:

DMT=dimethyl terephthalate;
BDO=1,4-butanediol;
BHBT=an oligomer containing one terephthalate and two butanediol moieties;
THF=tetrahydrofuran;
MeOH=methanol;
PBT=poly(butylene terephthalate);
Ti(OBu)=tetra-n-butyl titanate;
Zr(acac)=zirconium tetrakis (2,4-pentanedionate);
SDP=sodium dihydrogen phosphate monohydrate.

Molecular weights are weight average and were determined by gel permeation chromatography. Intrinsic viscosities were determined at 30° C. in phenol/tetrachloroethane (40:60 by weight).

EXAMPLE 1

Samples of BHBT were sealed under vacuum in tubes with various proportions of Ti(OBu), Zr(acac) and SDP. The tubes were heated for 30 minutes at 234° C., whereupon the BHBT was converted to PBT. The products were analyzed for degree of polymerization (DP) and the results are given in Table I; mole percentages of titanium and zirconium are based on the total of the two metals.

TABLE 1

| Sample | Ti(OBu), mole % | Zr(acac), mole % | Molar ratio, P: (Ti + Zr) | DP |
|---|---|---|---|---|
| 1 | 100 | 0 | 0 | 0.1 |
| 2 | 100 | 0 | 2 | 1.4 |
| 3 | 100 | 0 | 4 | 0.1 |
| 4 | 50 | 50 | 0 | 11.0 |
| 5 | 50 | 50 | 2 | 33.4 |
| 6 | 50 | 50 | 4 | 35.1 |
| 7 | 33.3 | 66.7 | 0 | 10.3 |
| 8 | 33.3 | 66.7 | 2 | 36.5 |
| 9 | 33.3 | 66.7 | 4 | 30.5 |
| 10 | 20 | 80 | 0 | 12.9 |
| 11 | 20 | 80 | 2 | 25.1 |
| 12 | 20 | 80 | 4 | 30.3 |
| 13 | 0 | 100 | 0 | 3.54 |
| 14 | 0 | 100 | 2 | 9.6 |
| 15 | 0 | 100 | 4 | 13.2 |

It can be seen from Samples 1–3 that polymerization with titanium alone, under these conditions, is very slow whether or not phosphate is present. Samples 13–15 show that zirconium alone is also quite slow although the addition of phosphate increases the reaction rate. Samples 4–12 show that the reaction rate increases substantially when both titanium and zirconium are present in the catalyst, especially with the addition of phosphate.

EXAMPLE 2

Stainless steel reactors fitted with paddle stirrers and distillation heads were charged with 705 g (3.63 moles) of DMT and 458 g (5.08 moles) of BDO. The reactors were heated and various proportions of Ti(OBu), Zr(acac) and SDP, to a total proportion of titanium and zirconium compounds of 0.8 mmol per mmol of DMT, were added when the temperatures reached about 150° C. The temperatures of the reaction mixtures were increased to 215° C. over 20 minutes, whereupon methanol began distilling from the reactors.

When the ester interchange reactions were about 95% complete as determined from the amounts of methanol collected, the distillation columns were closed and vacuum lines were connected to the reactors. The internal pressures were slowly decreased to 1.5 mbar as the temperatures were increased to 245° C. The distillates were analyzed to determine the weight proportions of MeOH and THF therein.

When the polycondensations were complete as shown by the torque required to stir the mixtures, the PBT products were removed and analyzed. The results are given in Table II, with molar proportions of catalyst constituents indicated.

TABLE II

| Sample | 16 | 17 | 18 | 19 | 20 |
|---|---|---|---|---|---|
| Catalyst | Ti(OBu) | Ti(OBu)/SDP, 1:12 | Ti(OBu)/Zr(acac)/ SDP, 1:2:12 | Ti(OBu)/Zr(acac), 1:3 | Ti(OBu)/Zr(acac)/ SDP, 1:3:16 |
| Ester interchange: | | | | | |
| Time, min. | 110 | 95 | 50 | 105 | 105 |
| MeOH:THF | 44.5 | 54.6 | 65.7 | 27.6 | 44.5 |
| Polycondensation: | | | | | |
| Time, min. | 115 | 80 | 80 | 75 | 80 |
| MeOH:THF | 2.56 | 1.1 | 1.5 | 1.7 | 2.6 |
| Product IV, dl/g | 1.12 | 1.13 | 1.04 | 0.93 | 1.06 |
| Product Mw | 127,100 | 121,200 | 122,500 | 88,900 | 93,300 |

From a consideration of Samples 16–18, it is apparent that the catalyst composition of the invention (Sample 18) afforded PBT of equivalent IV and molecular weight in a substantially shorter total time and with an overall lower proportion of undesirable THF as a by-product. The same is true of Samples 19–20, in which Sample 20 employed a catalyst composition of the invention.

EXAMPLE 3

The procedure was similar to that of Example 2, except that mole percentages of THF in the MeOH-THF mixtures were recorded directly and the melt viscosities of the PBT products were determined via a strain gauge, the strain gauge readings being directly proportional to melt viscosity. Polycondensations were deemed complete when the strain gauge values did not change over a 5-minute period. The results are given in Table III.

TABLE III

| Sample | 21 | 22 | 23 | 24 |
|---|---|---|---|---|
| Catalyst | Ti(OBu) | Ti(OBu)/Zr(acac)/ SDP, 1:2:12 | Ti(OBu)/Zr(acac)/ SDP, 1:3:16 | Ti(OBu)/Zr(acac)/ SDP, 1:4:20 |
| Ester interchange: | | | | |
| Time, min. | 95 | 50 | 105 | 85 |
| THF, mole % | 1.8 | 1.5 | 2.2 | — |
| Polycondensation: | | | | |
| Time, min. | 80 | 80 | 80 | 80 |
| THF, mole % | 47.6 | 40.0 | 27.8 | |
| Strain gauge reading | 51 | 40 | 23 | |

Samples 21–23 show a decrease in melt viscosity of otherwise comparable PBT products as a result of employing the catalyst compositions of the invention. Sample 24, when compared with Sample 21, shows a decrease in time for the ester interchange reaction for a similar reason.

What is claimed is:

1. A catalyst composition consisting essentially of the combination of a titanium-based compound, a zirconium-based compound and a phosphate-forming compound, and any reaction products thereof.

2. A composition according to claim 1 wherein the molar ratio of zirconium to titanium is in the range of about 1–5:1.

3. A composition according to claim 1 wherein the molar ratio of zirconium to titanium is in the range of about 2–4:1.

4. A composition according to claim 1 wherein the phosphate-based compound is present in a molar ratio of phosphate to titanium in the range of about 1–25:1.

5. A composition according to claim 1 wherein the titanium-based compound is tetraethyl titanate, tetra-n-propyl titanate, tetraisopropyl titanate, tetra-n-butyl titanate, tetra-(2-ethylhexyl) titanate, titanium diisopropoxide bis(2,4-pentanedionate), titanium oxide 2,4-pentanedionate or a water-stable titanium compound.

6. A composition according to claim 5 wherein the titanium-based compound is tetra-n-butyl titanate.

7. A composition according to claim 1 wherein the zirconium-based compound is zirconium acetate, zirconium tetrakis(2,4-pentanedionate), tetra-n-butyl zirconate, tetra-t-butyl zirconate, tetraethyl zirconate, zirconium isopropoxide isopropanol complex, tetra-n-propyl zirconate or zirconium tetrakis(trifluoro-2,4-pentanedionate).

8. A composition according to claim 7 wherein the zirconium-based compound is zirconium tetrakis(2,4-pentanedionate).

9. A composition according to claim 1 wherein the phosphate-forming compound is an alkali metal phosphate, alkali metal phosphite, alkali metal hypophosphite or alkali metal polyphosphate.

10. A composition according to claim 9 wherein the phosphate-forming compound is sodium dihydrogen phosphate.

11. A method for preparing a polyester by reaction of at least one dihydroxy compound with at least one dicarboxylic acid, corresponding ester, or ester-forming derivative, wherein said reaction is carried out in the presence of a catalyst composition comprising the combination of a titanium-based compound, a zirconium-based compound and a phosphate-forming compound, and any reaction products thereof.

12. A method for preparing a thermoplastic polyester which comprises forming a precursor oligomer by ester interchange of at least one dihydroxy compound with at least one dicarboxylic acid, corresponding ester, or ester-forming derivative to form the precursor oligomer, and then subjecting the precursor oligomer to polycondensation to form the polyester, wherein the process is carried out in the presence of a catalyst composition comprising the combination of a titanium-based compound, a zirconium-based compound and a phosphate-forming compound, and any reaction products thereof.

13. A method according to claim 12 wherein the catalyst composition is present at a level in the range of about 0.5–5.0 mmol of total titanium and zirconium compounds per mmol of dicarboxylic acid, ester or ester-forming derivative.

14. A method according to claim 12 wherein the catalyst composition is present at a level in the range of about 1.0–2.0 mmol of total titanium and zirconium compounds per mmol of dicarboxylic acid, ester or ester-forming derivative.

15. A method according to claim 13 wherein the dihydroxy compound is 1,4-butanediol.

16. A method according to claim 13 wherein the molar ratio of zirconium to titanium is in the range of about 1–5:1.

17. A method according to claim 13 wherein the phosphate-based compound is present in a molar ratio of phosphate to titanium in the range of about 10–25:1.

18. A method according to claim 13 wherein the titanium-based compound is tetraethyl titanate, tetra-n-propyl titanate, tetraisopropyl titanate, tetra-n-butyl titanate, tetra-(2-ethylhexyl) titanate, titanium diisopropoxide bis(2,4-pentanedionate), titanium oxide 2,4-pentanedionate or a water-stable titanium compound.

19. A method according to claim 13 wherein the zirconium-based compound is zirconium acetate, zirconium tetrakis(2,4-pentanedionate), tetra-n-butyl zirconate, tetra-t-butyl zirconate, tetraethyl zirconate, zirconium isopropoxide isopropanol complex, tetra-n-propyl zirconate or zirconium tetrakis(trifluoro-2,4-pentanedionate).

20. A method according to claim 13 wherein the phosphate-forming compound is an alkali metal phosphate, alkali metal phosphite, alkali metal hypophosphite or alkali metal polyphosphate.

* * * * *